(12) United States Patent
Pawar et al.

(10) Patent No.: US 9,800,392 B1
(45) Date of Patent: Oct. 24, 2017

(54) SELECTING BETWEEN TDD-FDD CARRIER AGGREGATION APPROACHES BASED ON TYPE OF COMMUNICATION

(71) Applicant: Sprint Spectrum L.P., Overland Park, KS (US)

(72) Inventors: Hemanth B. Pawar, Brambleton, VA (US); Shilpa K. Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 257 days.

(21) Appl. No.: 14/688,508

(22) Filed: Apr. 16, 2015

(51) Int. Cl.
- H04L 5/14 (2006.01)
- H04W 72/04 (2009.01)
- H04W 76/04 (2009.01)

(52) U.S. Cl.
CPC ............... *H04L 5/14* (2013.01); *H04W 72/04* (2013.01); *H04W 76/046* (2013.01)

(58) Field of Classification Search
None
See application file for complete search history.

(56) References Cited

U.S. PATENT DOCUMENTS

| 6,721,569 B1 | 4/2004 | Hashem et al. |
| 2011/0013581 A1* | 1/2011 | Lee ................. H04L 5/0007 370/329 |
| 2011/0238825 A1* | 9/2011 | Maffione ............ H04L 41/06 709/224 |
| 2012/0252477 A1 | 10/2012 | Rao |
| 2012/0282942 A1 | 11/2012 | Uusitalo et al. |
| 2012/0327821 A1* | 12/2012 | Lin ................... H04W 72/048 370/280 |
| 2013/0010711 A1 | 1/2013 | Larsson et al. |

(Continued)

FOREIGN PATENT DOCUMENTS

EP 2385653 A2 9/2011

OTHER PUBLICATIONS

"Ericsson, Singtel and Qualcomm Earn FDD/TDD Carrier Aggregation First", Ericsson Press Release, Oct. 7, 2014.

(Continued)

*Primary Examiner* — Edan Orgad
*Assistant Examiner* — Saumit Shah (57) ABSTRACT

Disclosed are a methods and systems for selecting a carrier aggregation approach. In particular, a wireless communication system includes a base station configured to serve a UE with carrier aggregation service on a TDD carrier and an FDD carrier. Accordingly, the system determines a type of content that will be transmitted between the base station and the UE and, based on the type of content, the system selects an approach for serving the UE with the carrier aggregation service. This selection is between the base station (i) carrying out uplink communication using only the TDD carrier and carrying out downlink communication using only the FDD carrier and (ii) carrying out downlink communication using only the TDD carrier and carrying out uplink communication using only the FDD carrier. Based on the selecting, the system configures the base station to serve the UE with the carrier aggregation service using the selected approach.

17 Claims, 5 Drawing Sheets

(56) References Cited

U.S. PATENT DOCUMENTS

| | | | | |
|---|---|---|---|---|
| 2014/0334371 A1* | 11/2014 | Kim | ................. | H04W 52/0206 |
| | | | | 370/311 |
| 2015/0334702 A1* | 11/2015 | Ji | ..................... | H04W 72/1257 |
| | | | | 370/280 |
| 2015/0350094 A1* | 12/2015 | Izhak-Ratzin | ...... | H04L 47/2441 |
| | | | | 370/235 |
| 2016/0218850 A1* | 7/2016 | Gross | ..................... | H04L 5/006 |

OTHER PUBLICATIONS

U.S. Appl. No. 14/575,455, filed Dec. 18, 2014.
"Carrier Aggregation—Activation and Deactivation of Secondary Calls", How LTE Stuff Works, printed from the World Wide Web, dated Oct. 17, 2014.
U.S. Appl. No. 13/964,929, filed Aug. 12, 2013.
U.S. Appl. No. 14/609,617, filed Jan. 30, 2015.
U.S. Appl. No. 14/507,128, filed Oct. 6, 2014.

* cited by examiner

SELECTING BETWEEN TDD-FDD CARRIER AGGREGATION APPROACHES BASED ON TYPE OF COMMUNICATION

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

Depending on the air interface protocol and other factors, a coverage area may operate using a frequency division duplex (FDD) arrangement or may operate using a time division duplex (TDD) arrangement. In an FDD arrangement, different carrier frequencies or ranges of frequency are used for the downlink than for the uplink. With this FDD arrangement, an FDD carrier may therefore include a pair of frequency channels such that a first channel of the pair is used for downlink communication and a second channel of the pair is used for uplink communication. Whereas, in a TDD arrangement, the same carrier frequency or range of frequency is used for the downlink and uplink and is allocated over time among downlink and uplink communications. With this TDD arrangement, a TDD carrier may therefore include a single frequency channel divided over time into segments for downlink communication and other segments for uplink communication. By way of example, a recent version of the LTE standard of the Universal Mobile Telecommunications System (UMTS) supports both the TDD arrangement and the FDD arrangement.

Furthermore, in accordance with the recent version of the LTE standard, each coverage area of a base station may operate on one or more carriers spanning 1.4 MHz, 3 MHz, 5 MHz, 10 MHz, 15 MHz, or 20 MHz, with each carrier being divided primarily into subcarriers spaced apart from each other by 15 kHz. Further, the air interface is divided over time into a continuum of 10-millisecond frames, with each frame being further divided into ten 1-millisecond subframes or transmission time intervals (TTIs) that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier. Through the attach process and/or subsequently, the base station and supporting LTE network infrastructure may establish for the UE one or more bearers, essentially defining logical tunnels for carrying bearer data between the UE and a transport network such as the Internet.

Once attached with the base station, a UE may then operate in a "connected" mode in which the base station may schedule data communication to and from the UE on the UE's established bearer(s). In particular, when a UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. LTE also supports uplink control signaling on the PUCCH using uplink control information (UCI) messages. UCI messages can carry scheduling requests from UEs, requesting the base station to allocate PUSCH resource blocks for uplink bearer data communication.

When a UE is attached with a base station on a particular carrier, the base station provides DCIs to the UE on the PDCCH of that particular carrier and schedules downlink communication of bearer data to the UE on the PDSCH of that particular carrier. In another arrangement, a revision of LTE known as LTE-Advanced may permit a base station to serve a UE with "carrier aggregation," by which the base station schedules bearer communication with one or more UEs on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers.

When carriers are aggregated, each carrier may be referred to as a component carrier. Of the component carriers, one may be a primary carrier (or "PCell") and the others may be secondary carriers (or "SCells"). The primary carrier may be the carrier that the UE receives with the strongest signal and/or may be the only carrier on which control signaling is transmitted (e.g., the carrier on which the UE is attached). However, other factors may be taken into account when assigning a primary carrier. Whereas, the secondary carriers may provide for the additional bandwidth.

OVERVIEW

A wireless communication system may serve a UE over an air interface connection between a base station and the UE. While serving the UE, the wireless communication system may carry out various transmissions over the air interface between the base station and the UE. Depending on the arrangement of the air interface and other factors, some transmissions for particular services may experience interruptions. These interruptions could take the form of delays in transmission of content, reduced quality of service, and/or lack of continuity in a provided service, among others.

In practice, some transmissions may be tolerant to these interruptions, such as transmissions for lower priority services and/or lower priority content for instance. Whereas, other transmissions may be intolerant to interruptions, such as transmissions for higher priority services and/or higher priority content for instance. By way of example, transmission of a high-definition (HD) real-time video feed may qualify as a higher priority service/content and would thus benefit from minimum interruptions. Whereas, transmission of web content, transmission of e-mail content, and transmission (e.g., upload or download) of content (e.g., video files) to/from a cloud-based service may each qualify as a lower priority service/content and could possibly tolerate at least some interruptions.

In some scenarios, communications between the base station and the UE may involve uplink transmissions that are tolerant to interruptions and downlink transmissions that are intolerant to interruptions or vice versa. For example, the UE may receive transmission of an HD real-time video feed on the downlink while transmitting (e.g., uploading) content to a cloud-based service on the uplink. In another example, the UE may transmit an HD real-time video feed (e.g., via a video chat service) on the uplink while receiving transmission of e-mail content on the downlink. Other examples are also possible.

In such scenarios, the system may increase an extent of network resources allocated for use in a particular direction (e.g., downlink) so as to minimize interruptions to the interruption-intolerant transmissions in that particular direction. When the system increases the extent of network resources allocated for use in a particular direction, the system generally may also increase an extent of network resources allocated for use in the opposing direction (e.g., uplink) on which the interruption-tolerant transmissions are transmitted. However, if transmissions in the opposing direction are tolerant to interruptions, these transmissions may not necessarily need this increase in the extent of network resources. Hence, this approach may increase in the extent of network resources allocated for use in the opposing direction may lead to unnecessary consumption of network resources, among other undesirable outcomes.

Alternatively, the system may not increase the extent of network resources allocated for use in the particular direction, such as in an attempt to conserve network resources for instance. When the system does not increase the extent of network resources allocated for use in the particular direction. The system generally may also not increase the extent of network resources allocated for use in the opposing direction. In this case, some of the interruption-intolerant transmissions may end up experiencing interruptions. Overall, this approach may result in interruptions to transmissions that are generally intolerant to interruptions, among other undesirable outcomes.

Disclosed herein is an arrangement to help overcome problems resulting from the above-mentioned approaches. In accordance with the disclosure, the wireless communication system could arrange the base station to serve the UE with carrier aggregation service on at least a first carrier and a second carrier. The first carrier may be a TDD carrier that defines a single frequency channel multiplexed over time for uplink and downlink communication. While the second carrier may be an FDD carrier that defines separate frequency channels respectively for uplink and downlink communication.

With this arrangement, the system could advantageously use only the FDD carrier for interruption-intolerant transmissions in one direction (e.g., downlink) while using only the TDD carrier for interruption-tolerant transmissions in the opposing direction (e.g., uplink). In particular, as noted above, TDD transmissions are multiplexed over time for uplink and downlink communication. Due to this TDD arrangement, TDD transmissions in a given direction may utilize less network resources compared to an extent of resources used for FDD transmissions in the same direction, thereby making the TDD carrier suitable for interruption-tolerant transmissions. Whereas, as noted above, the FDD arrangement generally devotes separate frequency channels respectively for uplink and downlink communication. This FDD arrangement may thus provide for more resources with which the system could carry transmissions in each direction as compared to the extent of resources provided in by the TDD arrangement in each direction. Such additional resources could thus help reduce (or eliminate) interruptions of interruption-intolerant transmissions, thereby making the FDD carrier suitable for interruption-intolerant transmissions.

Additionally, according to some standards, an FDD carrier may operate on lower frequencies relative to frequencies on which a TDD carrier operates. Such lower frequencies may generally lead to transmissions having a relatively lower path loss compared to transmissions on higher frequencies. A path loss defines the extent of attenuation for an electromagnetic wave as it propagates through space. Hence, operating at a frequency having a lower corresponding path loss may result in transmissions that are received with relatively higher signal strength. This higher signal strength could therefore provide for an additional advantage in using the FDD carrier for transmissions that are intolerant to interruptions.

As such, in accordance with the disclosure, the wireless communication system could determine a type of content that will be transmitted between the base station and the UE and, based on the type of content (among other possible factors), could then select an approach for serving the UE with the carrier aggregation service. In particular, if the type of content that will be transmitted on the downlink is interruption-intolerant and the type of content that will be transmitted on the uplink is interruption-tolerant, the system may responsive to that select an approach that involves the base station carrying out uplink communication using only the TDD carrier and carrying out downlink communication using only the FDD carrier. Whereas, if the type of content that will be transmitted on the downlink is interruption-tolerant and the type of content that will be transmitted on the uplink is interruption-intolerant, the system may responsive to that select an approach that involves the base station carrying out downlink communication using only the TDD carrier and carrying out uplink communication using only the FDD carrier.

Once the wireless communication system selects an approach, the system may then configure the base station to serve the UE with the carrier aggregation service using the selected approach. This may involve initiating the carrier aggregation service and configuring the service in accordance with the selected approach. Alternatively, if the UE is already being served using the carrier aggregation service, this may involve reconfiguring the service in accordance with the selected approach. In either case, the selected approach may allow for elimination (or reduction) of interruptions while carrying out interruption-intolerant transmissions in the particular direction (e.g., downlink) as well as for conservation of some network resources while carrying out interruption-tolerant transmissions in the opposing direction (e.g., uplink).

Accordingly, disclosed herein is a method for controlling communication over an air interface between a base station and a UE. The method is operable by a wireless communication system including the base station that serves the UE with carrier aggregation service on (i) a TDD carrier defining a single frequency channel multiplexed over time for uplink and downlink communication and (ii) an FDD carrier defining separate frequency channels respectively for uplink and downlink communication.

In accordance with the method, the wireless communication system determines a type of content that will be transmitted between the base station and the UE. Based at least on the determined type of content, the wireless communication system selects an approach for serving the UE with the carrier aggregation service. In particular the wireless communication system may select between (i) the base station carrying out uplink communication using only the TDD carrier and carrying out downlink communication using only the FDD carrier and (ii) the base station carrier out downlink communication using only the TDD carrier and carrying out uplink communication using only the FDD carrier. Once the wireless communication system selects the approach, the wireless communication system configures the base station to serve the UE with the carrier aggregation service using the selected approach.

Additionally, disclosed herein is a method operable by a wireless communication system including a base station configured to serve a UE with carrier aggregation service on (i) a TDD carrier defining a single frequency channel multiplexed over time for uplink and downlink transmissions and (ii) an FDD carrier defining separate frequency channels respectively for uplink and downlink transmissions. In accordance with the method, the wireless communication system serves the UE over an air interface connection between the base station and the UE. While serving the UE, the wireless communication system determines a type of content that will be transmitted between the base station and the UE Based at least on the determined type of content, the wireless communication system selects an arrangement for serving the UE with the carrier aggregation service. In particular, the wireless communication system selects between (i) the base station carrying out uplink transmissions using only the TDD carrier and carrying out downlink transmissions using only the FDD carrier and (ii) the base station carrying out uplink transmissions using only the FDD carrier and carrying out downlink transmissions using only the TDD carrier. Once the wireless communication system selects the arrangement, the wireless communication system modifies the air interface connection such that the base station serves the UE with the carrier aggregation service using the selected arrangement.

Further, disclosed herein is a wireless communication system including a base station configured to serve a UE with carrier aggregation service on (i) a TDD carrier defining a single frequency channel multiplexed over time for uplink and downlink communication and (ii) an FDD carrier defining separate frequency channels respectively for uplink and downlink communication. The wireless communication system also includes a controller configured to perform operations.

These operations may involve determining a type of content that will be transmitted between the base station and the UE. These operations may also involve, based at least on the determined type of content, making a determination as to whether the base station should serve the UE with the carrier aggregation service using (i) a first configuration that comprises the base station carrying out uplink communication using only the TDD carrier and carrying out downlink communication using only the FDD carrier or (ii) a second configuration that comprises the base station carrying out downlink communication using only the TDD carrier and carrying out uplink communication using only the FDD carrier. If the determination is to use the first configuration, the operations may involve arranging the base station to serve the UE with the carrier aggregation service using the first configuration. Whereas, if the determination is to use the second configuration, the operations may involve arranging the base station to serve the UE with the carrier aggregation service using the second configuration.

Yet further, in another respect, disclosed is a non-transitory computer-readable medium having stored thereon instructions executable by a processor to cause a wireless communication system to carry out functions such as those noted above, to facilitate selection between TDD-FDD carrier aggregation approaches based on type of communication.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
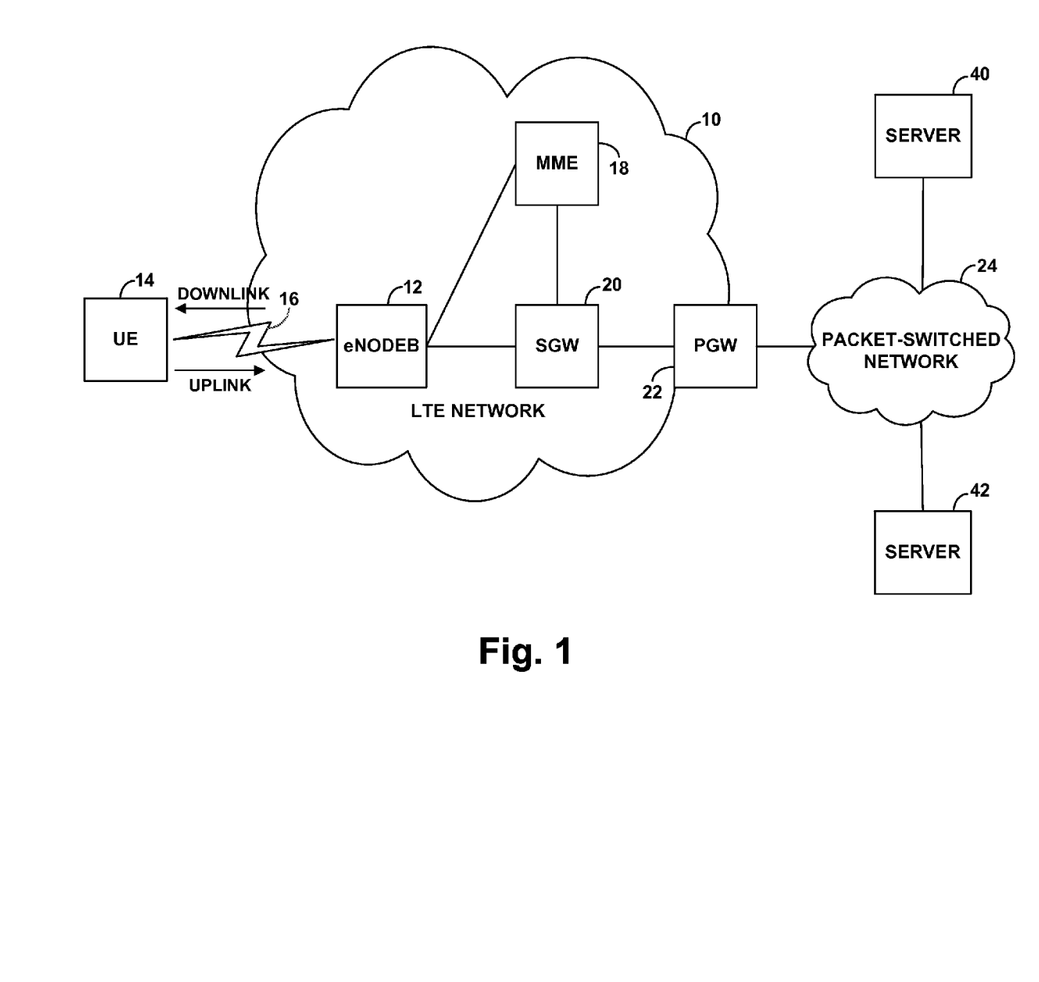
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes at least one example LTE macro base station 12 known as an eNodeB, which has an antenna structure and associated equipment for providing an LTE coverage area in which to serve UEs such as an example UE 14. More specifically, the eNodeB 12 radiates to define a wireless air interface 16 through which the eNodeB 12 may communicate with one or more served UEs, such as UE 14, via the downlink and the uplink.

As shown in FIG. 1, the eNodeB 12 has a communication interface with a Mobility Management Entity (MME) 18. The MME 18 can function as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12 may be communicatively linked with a core network, which may be operated by a wireless service provider. The core network then provides connectivity with one or more MMEs, such as MME 18, as well as one or more gateways such as SGW 20 and PGW 22.

Figure 2:
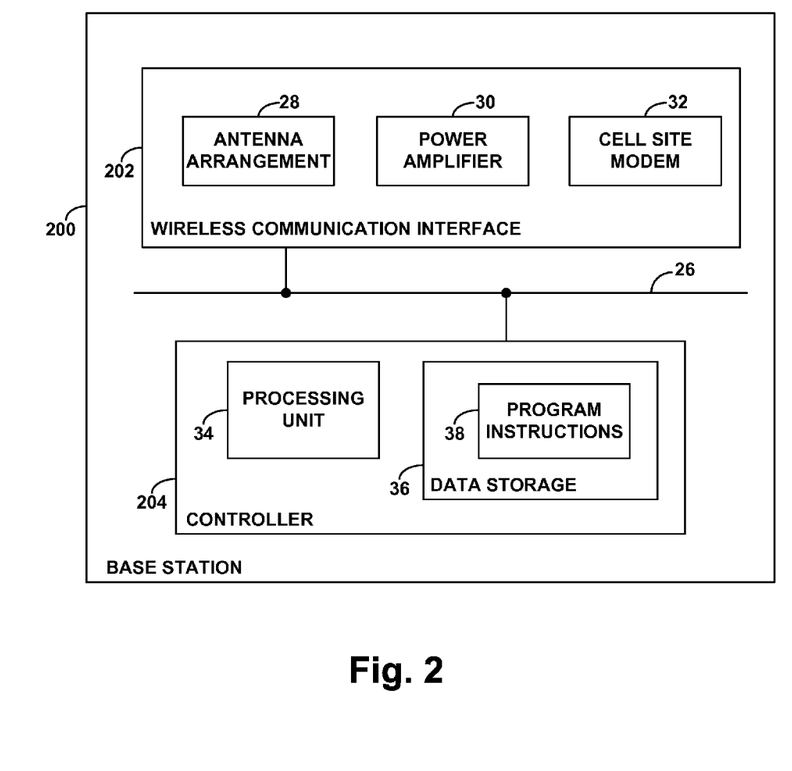
FIG. 2 is a simplified block diagram of a base station in which the present method can be implemented.

FIG. 2 is next a simplified block diagram of a representative base station 200 such as eNodeB 12, illustrating some of the components that can be included in such an entity. As shown in FIG. 2, the representative base station 200 may include a wireless communication interface 202 and a controller 204. Additionally, these components of the base station 200 may be communicatively linked together by a system bus, network, or other connection mechanism 26. Alternatively, they may be integrated together in various ways.

As shown, wireless communication interface 202 may include an antenna arrangement 28, which may be tower mounted, and associated components such as a power amplifier 30 and a cell site modem 32 for engaging in air interface communication with UEs via the antenna arrangement 28, so as to transmit data and control information to the UEs and receive data and control information from the UEs. Additionally, controller 204 may include processing unit 34 and data storage 36 and is arranged to manage or carry out various functions such as those discussed herein.

Processing unit 34 may then comprise one or more general purpose processors (e.g., microprocessors) and/or special-purpose processors (e.g., digital signal processors and/or application specific integrated circuits) and may be integrated in whole or in part with the wireless communication interface 202. And data storage 36 may include one or more volatile and/or non-volatile storage components, such as magnetic, optical, flash, or other types of non-transitory computer readable media, and may be integrated in whole or in part with processing unit 34.

As shown, data storage 36 may hold (e.g., have encoded thereon) program instructions 38, which may be executable by processing unit 34 to carry out various controller functions. As such, the processing unit 34 programmed with instructions 38 may define part or all of a controller for controlling operation of the base station 200. Alternatively or additionally, however, such control functionality could be provided external to the base station 200, in another entity (e.g., separate from the base station 200) such as by a base station control entity (e.g., MME 18), which may be communicatively linked with the base station and may serve to control certain aspects of base station operation generally.

As discussed above, in accordance with LTE, when the UE 14 enters into coverage of the eNodeB 12, the UE 14 and LTE network 10 may engage in an initial attach process. Through the initial attach process and/or subsequently, the LTE network may establish for the UE 14 one or more bearers extending between the UE 14 and the PGW 22, for carrying data communications between the UE 14 and the packet-switched network 24. This establishment of bearers may be initiated by the UE 14 or may be initiated by the LTE network 10. An initial setup of one or more bearers for the UE 14 may involve establishing for each bearer a respective virtual tunnel that includes a radio-link tunnel extending between the UE 14 and the eNodeB 12 and a backhaul tunnel extending between the eNodeB 12 and the PGW 22 via the SGW 20. Further, in the event that a "Radio Resource Control" (RRC) connection is not already established, the process may involve establishing for the UE 14 a logical RRC connection encompassing the one or more radio-link portions.

When an RRC connection is established or modified, the eNodeB 12 can specify one or more carriers to be used to serve the UE 14. To specify the one or more carriers, the eNodeB 12 may send an RRC connection configuration message to the UE 14 when establishing the RRC connection or the eNodeB 12 may send an RRC connection reconfiguration message when the RRC connection is being modified. In particular, the RRC connection configuration (or reconfiguration) message may identify the UE 14 (e.g., using the GUTI) and may direct the UE 14 to operate on a set of one or more carriers. Moreover, the RRC connection configuration (or reconfiguration) message may identify the particular carriers in the set of one or more carriers, such as by specifying a global identifier of each respective carrier for instance. After receiving the RRC connection configuration (or reconfiguration) message, the UE 14 may then be set to monitor transmissions on the designated set of one or more carriers.

Figure 3:
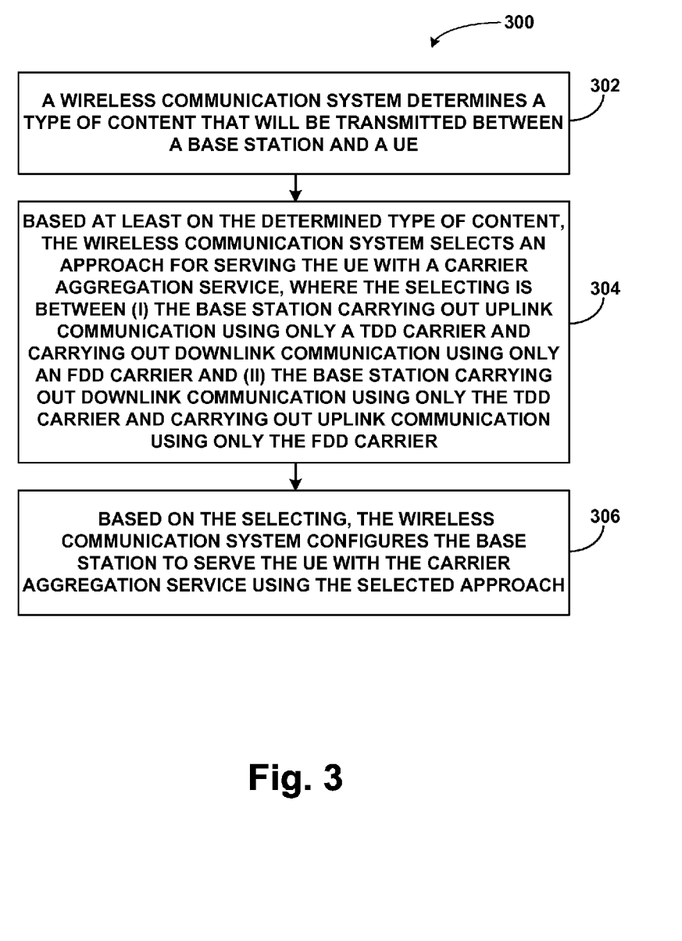
FIG. 3 is a flowchart illustrating a method for selecting between TDD-FDD carrier aggregation approaches based on type of communication, in accordance with an example embodiment.

FIG. 3 is a flowchart illustrating a method 300, according to an example embodiment. Illustrative methods, such as method 300, may be carried out in whole or in part by component(s) and/or arrangement(s) in a wireless communication system, such as by the one or more of the components of the representative LTE network 10 shown in FIG. 1 and/or with one or more of the components of the base station 200 shown in FIG. 2. However, it should be understood that example methods, such as method 300, may be carried out by other entities or combinations of entities as well as in other arrangements, without departing from the scope of the disclosure.

In particular, method 300 may be operable by a wireless communication system including a base station (e.g., eNodeB 12) that is configured to serve a UE (e.g., UE 14) over an air interface (e.g., air interface 16) with carrier aggregation service on (i) a TDD carrier defining a single frequency channel multiplexed over time for uplink and downlink communication and (ii) an FDD carrier defining separate frequency channels respectively for uplink and downlink communication.

As shown by block 302 in FIG. 3, method 300 involves the wireless communication system determining a type of content that will be transmitted between the base station and the UE. At block 304, method 300 then involves, based at least on the determined type of content, the wireless communication system selecting an approach for serving the UE with the carrier aggregation service, where the selecting is between (i) the base station carrying out uplink communication using only the TDD carrier and carrying out downlink communication using only the FDD carrier and (ii) the base station carrying out downlink communication using only the TDD carrier and carrying out uplink communication using only the FDD carrier. At block 306, method 300 then involves, based on the selecting, the wireless communication system configuring the base station to serve the UE with the carrier aggregation service using the selected approach.

As noted above, the present disclosure provides for determining a type of content that will be communicated between the eNodeB 12 and the UE 14 and using that type of content as a basis to select a TDD-FDD carrier aggregation approach for serving the UE 14, and the disclosure then provides for causing the eNodeB 12 to serve the UE 14 using the selected approach. This process could be carried out by the eNodeB 12 itself and/or by one or more other network entities, such as with portions of the analysis carried out by an entity outside of the eNodeB 12 and the eNodeB 12 then responsively working to serve the UE 14 with carrier aggregation service using the selected approach. For simplicity, however, the process will be described here in a scenario where the eNodeB 12 carries out all aspects of the process.

The process may begin in a scenario where the eNodeB 12 is serving the UE 14 in an RRC-connected mode. In this mode, if the UE's radio-link-layer connection encompasses just one carrier, the signaling and bearer communication would occur on just that one carrier. For instance, the eNodeB 12 may allocate PDSCH and/or PUSCH resources on the carrier to carry the bearer data and may transmit to the UE 14 on a PDCCH of that carrier one or more DCI messages that specify the allocation, and the eNodeB 12 and UE 14 may communicate the data on the allocated resources. Whereas, if the UE's radio-link-layer connection encompasses multiple carriers and thus supports carrier aggregation service on those multiple carriers, the eNodeB 12 may allocate PDSCH and/or PUSCH resources on the multiple carriers concurrently (e.g., distributing the data transmission among resources on the multiple carriers) and may transmit to the UE 14 on a PDCCH of the PCell and perhaps also on a PDCCH of one or more SCells one or more DCI messages that specify the allocation, and the eNodeB 12 and UE 14 may communicate the data on the allocated resources.

In this way, the UE 14 may engage in data communication with various servers or other entities (possibly even other end user devices) on or via network 24, with the communication passing through the UE's radio-link-layer connection and through SGW 20, PGW 24, and network 24. FIG. 1 depicts two examples of such entities as servers 40 and 42. These servers may take various forms and may be set to communicate data representing various different types of content. By way of example, a representative server might be a web server that communicates web content, an e-mail server that communicates e-mail content, a streaming video server that transmits streaming video content (e.g., movies and television shows), a game server that communicates game content, an Internet Multimedia Subsystem (IMS) that supports voice calling, and the like. As a specific example, server 40 might be a streaming video server that is operated by one streaming video service provider and that provides streaming video content, and server 42 might be another streaming video server that is operated by another streaming video service provider and that also provides streaming video content. Other examples are possible as well.

To facilitate communication between the UE 14 and such entities, the UE 14 and each entity may each have a network address such as an Internet Protocol (IP) address on network 24. The UE 14 and the entity may thus transmit data to each other in the form of one or more IP data packets, each having a respective header segment specifying a source IP address and a destination IP address, and each having a respective payload segment carrying some or all of the data at issue. Further, when the UE 14 and the entity communicate data representing content of a particular type, such as content associated with a particular application, each packet may further include a transport port number (e.g., a particular Transmission Control Protocol (TCP) port number or User Datagram Protocol (UDP) port number) associated with that content type and/or another designation of the type of content carried by the packet, to facilitate processing by corresponding program logic at the UE 14 and/or at the entity.

The data carried in the payload segment of such packets may be a digitally encoded representation of particular content being communicated between the UE 14 and the entity. Such content may itself be media content of some type, such as video content, web content, voice content, gaming content, or the like. Alternatively, the content may be signaling content, such as Session Initiation Protocol (SIP), Real-Time Streaming Protocol (RTSP), or Hypertext Transfer Protocol (HTTP) messages used for setting up or otherwise controlling certain media content transmission. Such signaling content may then also include data that specifies other type of content that will be communicated to or from the UE 14. For instance, SIP signaling could carry a Session Description Protocol (SDP) segment that designates a type of content to be communicated to or from the UE 14.

In accordance with the disclosure, the eNodeB 12 may determine the type of content that will be communicated between the eNodeB 12 and the UE 14 in various ways. By way of example, eNodeB 12 may accomplish this based on deep packet inspection (DPI) of one or more packets passing to or from the UE 14, and/or based on various associated signaling or other data.

As an example of this, the eNodeB 12 may read one or more such packets to determine a type of content being carried by such packet(s) and could consider that to be an indication of the type of content that will be communicated between the eNodeB 12 and UE 14. For instance, the eNodeB 12 could read from one or more such packets a network address of a remote entity with which the UE 14 is communicating and/or a transport port number associated with the type of content, and the eNodeB 12 could map the network address and/or port number to a particular type of content.

To do this, the eNodeB 12 may include or have access to a table that maps various network addresses and/or port numbers to corresponding types of content (e.g., indicating for each network address one or more possible types of content, and further indicating for each port associated with data sent to or from that network address a corresponding type of content), and the eNodeB 12 may be programmed to refer to that table to determine the type of content that will be communicated to or from the UE 14. Through this process, the eNodeB 12 might thereby determine that such packet data is streaming video content from a particular provider, streaming video content from another particular provider, streaming video content generally, gaming content, voice content, web content, and/or various other types of content such as those noted above for instance.

As another example, the eNodeB 12 could read the payload of one or more such packets and programmatically evaluate the data in the payload to project what type of content will be communicated between the eNodeB 12 and UE 14. For instance, if the payload carries SIP signaling or the like, the eNodeB 12 could read that signaling to determine an SDP-based indication of type of content that will communicated to or from the UE 14, again possibly a type such as one of those noted above. Other examples are possible as well.

In turn, based at least on the determined type of content that will be communicated between the eNodeB 12 and the UE 14, (i) the eNodeB 12 may make a decision to serve the UE with carrier aggregation service using at least a TDD carrier and an FDD carrier (if the eNodeB 12 is not already serving the UE 14 with this particular carrier aggregation service) and (ii) the eNodeB 12 may select a particular approach for serving the UE 14 with the carrier aggregation service. This decision to serve the UE with carrier aggregation and/or the selection of the TDD-FDD carrier aggregation approach could be based on additional factors as well (i.e., in addition to consideration of the determined type of content), such as considerations of channel conditions (e.g., based on the amount of data to be transmitted over the air interface between the eNodeB 12 and the UE 14, the level of load on each of one or more carriers, and/or the UE-reported quality of the air interface connection). Further, the specific component carriers (e.g., the TDD and FDD carriers) that would be aggregated could take various forms and have various bandwidths, and could be contiguous or non-contiguous and inter-band and/or intra-band.

Selection of the TDD-FDD carrier aggregation approach may be from among at least first and second approaches. In the first approach, the eNodeB 12 may engage in uplink communication on only the TDD carrier and may engage in downlink communication on only the FDD carrier. As noted, the eNodeB 12 selects this first approach when downlink transmissions include a type of content that is interruption-intolerant and when uplink transmissions include a type of content that is interruption-tolerant. Whereas, in the second approach, the eNodeB 12 may engage in downlink communication on only the TDD carrier and may engage in uplink communication on only the FDD carrier. As noted, the eNodeB 12 selects this second approach when downlink transmissions include a type of content that is interruption-tolerant and when uplink transmissions include a type of content that is interruption-intolerant.

To facilitate this selection, the eNodeB 12 may include or have access to a table that maps various types of content to an indication of whether or not to apply carrier aggregation and further, if the indication is to apply carrier aggregation, to an indication of the particular TDD-FDD carrier aggregation approach. Alternatively, the table could map various types of content to an indication of the particular TDD-FDD carrier aggregation approach (e.g., without the indication of whether or not to apply carrier aggregation as that would be implicit). In either case, the eNodeB 12 may be programmed to refer to that table to select the particular approach to use while applying the carrier aggregation.

Such a table may, for instance, list various different providers' streaming video services and specify a respective approach per each provider's streaming video service (e.g., TDD uplink and FDD downlink for one provider's service; FDD uplink and TDD downlink for another provider's service), so that the eNodeB 12 may select the approach depending on which provider's streaming video service would be delivering streaming video content to the UE 14. In some cases, such a table might list other types of content with corresponding indications of the particular approach, and might designate some types of content with indications to not apply carrier aggregation and thus to use just a single carrier rather than multiple component carriers. In yet other cases, the table might also specify multiple respective approaches for at least some of the providers' streaming video services. For instance, the table may specify both the first and second approaches as corresponding to a particular service, so that the eNodeB 12 can select either approach (e.g., arbitrarily or based on additional factors) if this particular service would be delivering content to the UE 14.

Through this process, if the eNodeB 12 thereby decides to serve the UE 14 with carrier aggregation using a particular approach, then the eNodeB 12 may respond to that decision by configuring carrier aggregation service for the UE 14 in accordance with the selected approach. This may involve the eNodeB 12 initiating the carrier aggregation service for the UE 14 and configuring carrier aggregation for the UE 14 in accordance with the selected approach. Alternatively, if the eNodeB 12 is already serving the UE 14 with carrier aggregation, then the eNodeB 12 may reconfigure the carrier aggregation in accordance with the selected approach.

For example, the eNodeB 12 may configure the carrier aggregation in accordance with the selected approach by modifying the radio-link-layer connection, such as by engaging in RRC connection messaging with the UE. In particular, the eNodeB 12 may transmit to the UE 14 an RRC connection reconfiguration message that specifies the TDD and FDD carriers on which the eNodeB 12 will be serving the UE 14, such as by identifying each carrier by a respective global identifier for instance. Moreover, the RRC connection reconfiguration message may include a command for the UE 14 to operate in accordance with the selected approach.

With this arrangement, the eNodeB 12 may update its context record for the UE 14 to (i) indicate that the UE's radio-link-layer connection now encompasses at least the indicated TDD and FDD carriers and (ii) specify the selected approach, so that the eNodeB 12 may then engage in communication with the UE 14 on those carriers in accordance with the selected approach. Additionally, the UE 14 may update its context record to (i) indicate that the UE's radio-link-layer connection now encompasses at least the indicated TDD and FDD carriers and (ii) specify the selected approach, so that the UE 14 will be prepared to engage in communication with the eNodeB 12 on those carriers in accordance with the selected approach.

Figure 4:
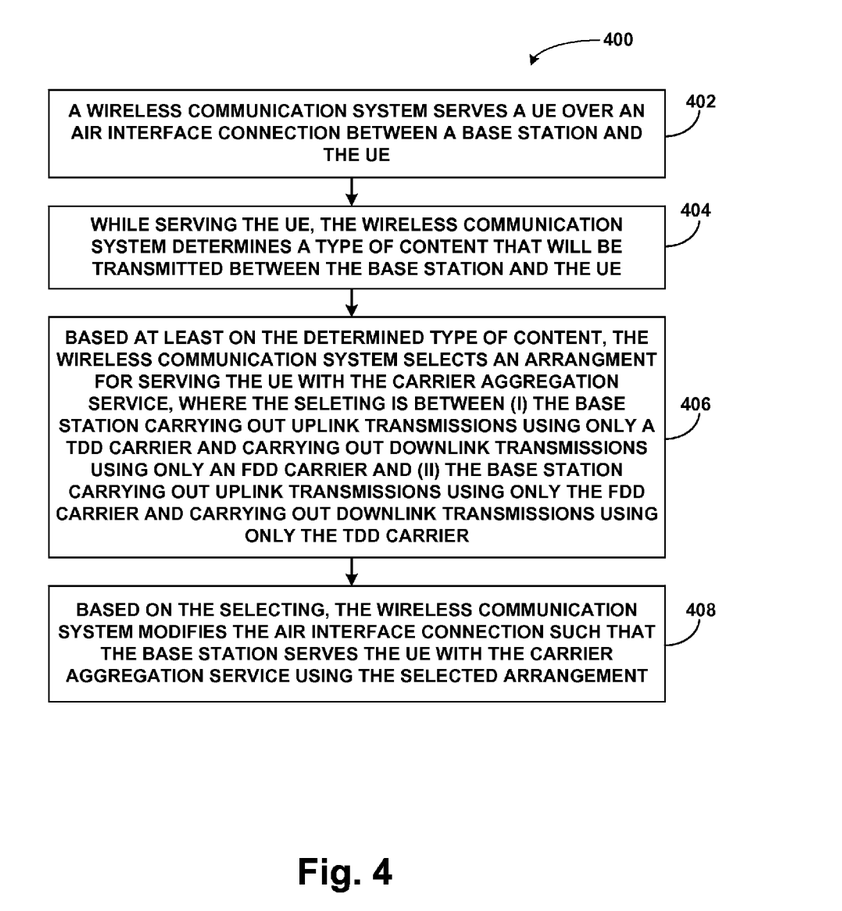
FIG. 4 is a flowchart illustrating another method for selecting between TDD-FDD carrier aggregation approaches based on type of communication, in accordance with an example embodiment.

FIG. 4 is next a flow chart depicting another example set of operations that can be carried out by a wireless communication system in an implementation of this process. In particular, this process is operable by a wireless communication system including a base station configured to serve a UE with carrier aggregation service on (i) a TDD carrier defining a single frequency channel multiplexed over time for uplink and downlink transmissions and (ii) an FDD carrier defining separate frequency channels respectively for uplink and downlink transmissions.

As shown in FIG. 4, at block 402, the wireless communication system serves the UE over an air interface connection between the base station and the UE. At block 404, while serving the UE, the wireless communication system determines a type of content that will be transmitted between the base station and the UE. At block 406, based at least on the determined type of content, the wireless communication system selects an arrangement for serving the UE with the carrier aggregation service. As shown, this selection is between (i) the base station carrying out uplink transmissions using only the TDD carrier and carrying out downlink transmissions using only the FDD carrier and (ii) the base station carrying out uplink transmissions using only the FDD carrier and carrying out downlink transmissions using only the TDD carrier. At block 408, based on the selecting, the wireless communication system modifies the air interface connection such that the base station serves the UE with the carrier aggregation service using the selected arrangement.

Figure 5:
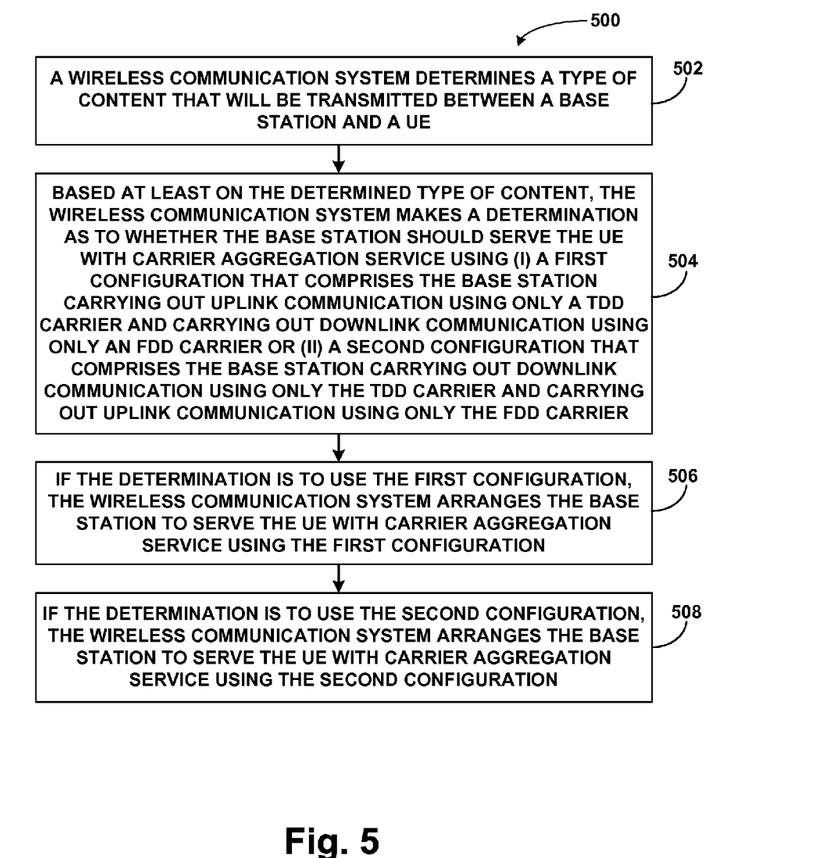
FIG. 5 is a flowchart illustrating yet another method for selecting between TDD-FDD carrier aggregation approaches based on type of communication, in accordance with an example embodiment.

FIG. 5 is next a flow chart depicting yet another example set of operations that can be carried out by a wireless communication system in an implementation of this process. In particular, this process is operable by a wireless communication system including (a) a base station configured to serve a user equipment device (UE) with carrier aggregation service on (i) a time division duplex (TDD) carrier defining a single frequency channel multiplexed over time for uplink and downlink communication and (ii) a frequency division duplex (FDD) carrier defining separate frequency channels respectively for uplink and downlink communication and (b) a controller configured to perform the operations.

As shown in FIG. 5, at block 502, the wireless communication system determines a type of content that will be transmitted between the base station and the UE. At block 504, based at least on the determined type of content, the wireless communication system makes a determination as to whether the base station should serve the UE with the carrier aggregation service using (i) a first configuration that comprises the base station carrying out uplink communication using only the TDD carrier and carrying out downlink communication using only the FDD carrier or (ii) a second configuration that comprises the base station carrying out downlink communication using only the TDD carrier and carrying out uplink communication using only the FDD carrier. Then at block 506, if the determination is to use the first configuration, the wireless communication system arranges the base station to serve the UE with the carrier aggregation service using the first configuration. Whereas at block 508, if the determination is to use the second configuration, the wireless communication system arranges the base station to serve the UE with the carrier aggregation service using the second configuration.

Exemplary embodiments have been described above. Those skilled in the art will understand, however, that changes and modifications may be made to these embodiments without departing from the true scope and spirit of the invention.

We claim:

1. A method for controlling communication over an air interface between a base station and a user equipment device (UE), wherein the method is operable by a wireless communication system including the base station, and wherein the base station serves the UE with carrier aggregation service on (i) a time division duplex (TDD) carrier defining a single frequency channel multiplexed over time for uplink and downlink communication and (ii) a frequency division duplex (FDD) carrier defining separate frequency channels respectively for uplink and downlink communication, the method comprising:

determining, by the wireless communication system, a type of content that will be transmitted between the base station and the UE;

based at least on the determined type of content, the wireless communication system selecting an approach for serving the UE with the carrier aggregation service, wherein the selecting is between (i) the base station carrying out uplink communication using only the TDD carrier and carrying out downlink communication using only the FDD carrier and (ii) the base station carrying out downlink communication using only the TDD carrier and carrying out uplink communication using only the FDD carrier, and wherein selecting the approach comprises (i) referring to mapping data that correlates each of various types of content with a respective approach for serving the UE with the carrier aggregation service and (ii) selecting the approach based on the mapping data; and based on the selecting, the wireless communication system configuring the base station to serve the UE with the carrier aggregation service using the selected approach.

2. The method of claim 1, wherein determining the type of content that will be transmitted between the base station and the UE comprises determining the type of content based on data within one or more data packets flowing to or from the UE.

3. The method of claim 2, wherein the one or more data packets include a network address, and wherein determining the type of content based on data within the one or more data packets flowing to or from the UE comprises determining the type of content based at least on the network address.

4. The method of claim 3, wherein the one or more data packets further include a transport port number, and wherein determining the type of content based on data within the one or more data packets flowing to or from the UE comprises determining the type of content based further on the transport port number.

5. The method of claim 2, wherein the one or more data packets carry a descriptor of the type of content, and wherein determining the type of content based on data within the one or more data packets flowing to or from the UE comprises determining the type of content based at least on the descriptor.

6. The method of claim 1, wherein configuring the base station to serve the UE with the carrier aggregation service using the selected approach comprises (i) transmitting from the base station to the UE a radio-resource-control (RRC) connection reconfiguration message that specifies the selected approach, and (ii) updating a UE context record to indicate that the base station is serving the UE with the carrier aggregation service using the selected approach.

7. The method of claim 1, wherein the separate frequency channels consist of frequencies that are lower than frequencies of the single frequency channel.

8. A method operable by a wireless communication system including a base station configured to serve a user equipment device (UE) with carrier aggregation service on (i) a time division duplex (TDD) carrier defining a single frequency channel multiplexed over time for uplink and downlink transmissions and (ii) a frequency division duplex (FDD) carrier defining separate frequency channels respectively for uplink and downlink transmissions, the method comprising:

serving, by the wireless communication system, the UE over an air interface connection between the base station and the UE;

while serving the UE, determining a type of content that will be transmitted between the base station and the UE;

based at least on the determined type of content, selecting an arrangement for serving the UE with the carrier aggregation service, wherein the selecting is between (i) the base station carrying out uplink transmissions using only the TDD carrier and carrying out downlink transmissions using only the FDD carrier and (ii) the base station carrying out uplink transmissions using only the FDD carrier and carrying out downlink transmissions using only the TDD carrier, and wherein selecting the arrangement comprises (i) referring to mapping data that correlates each of various types of content with a respective arrangement for serving the UE with the carrier aggregation service and (ii) selecting the arrangement based on the mapping data; and based on the selecting, modifying the air interface connection such that the base station serves the UE with the carrier aggregation service using the selected arrangement.

9. The method of claim 8, wherein determining the type of content that will be transmitted between the base station and the UE comprises determining the type of content based on data within one or more data packets flowing to or from the UE.

10. The method of claim 9, wherein the one or more data packets include a network address, and wherein determining the type of content based on data within the one or more data packets flowing to or from the UE comprises determining the type of content based at least on the network address.

11. The method of claim 10, wherein the one or more data packets further include a transport port number, and wherein determining the type of content based on data within the one or more data packets flowing to or from the UE comprises determining the type of content based further on the transport port number.

12. The method of claim 9, wherein the one or more data packets carry a descriptor of the type of content, and wherein determining the type of content based on data within the one or more data packets flowing to or from the UE comprises determining the type of content based at least on the descriptor.

13. The method of claim 8, wherein modifying the air interface connection comprises (i) transmitting from the base station to the UE a radio-resource-control (RRC) connection configuration message that specifies (a) the TDD and FDD carriers and (b) the selected arrangement, and (ii) updating a UE context record to indicate that the base station is serving the UE with the carrier aggregation service on the TDD and FDD carriers using the selected arrangement.

14. The method of claim 8, wherein the separate frequency channels consist of frequencies that are lower than frequencies of the single frequency channel.

15. A wireless communication system comprising:

a base station configured to serve a user equipment device (UE) with carrier aggregation service on (i) a time division duplex (TDD) carrier defining a single frequency channel multiplexed over time for uplink and downlink communication and (ii) a frequency division duplex (FDD) carrier defining separate frequency channels respectively for uplink and downlink communication;

a data storage, wherein the data storage contains mapping data that correlates each of various types of content with a respective configuration for serving the UE with the carrier aggregation service; and a controller configured to perform operations comprising:
    determining a type of content that will be transmitted between the base station and the UE;
    based at least on the determined type of content, making a determination as to whether the base station should serve the UE with the carrier aggregation service using (i) a first configuration that comprises the base station carrying out uplink communication using only the TDD carrier and carrying out downlink communication using only the FDD carrier or (ii) a second configuration that comprises the base station carrying out downlink communication using only the TDD carrier and carrying out uplink communication using only the FDD carrier, wherein making the determination comprises referring to the mapping data and making the determination based on the mapping data;
    if the determination is to use the first configuration, arranging the base station to serve the UE with the carrier aggregation service using the first configuration; and
    if the determination is to use the second configuration, arranging the base station to serve the UE with the carrier aggregation service using the second configuration.

16. The wireless communication system of claim 15, wherein the controller is part of the base station and is configured to cause the base station to perform the operations.

17. The wireless communication system of claim 15, wherein the controller is a Mobility Management Entity (MME).

* * * * *